& Utecht

United States Patent [19]

Beckman et al.

[11] Patent Number: 4,900,162

[45] Date of Patent: Feb. 13, 1990

[54] INFRARED THERMOMETRY SYSTEM AND METHOD

[75] Inventors: Kenneth A. Beckman, La Mesa; John A. Graham, San Diego, both of Calif.

[73] Assignee: IVAC Corporation, San Diego, Calif.

[21] Appl. No.: 325,929

[22] Filed: Mar. 20, 1989

[51] Int. Cl.$^4$ ............................ G01J 5/20; G01J 5/12; G01J 5/16

[52] U.S. Cl. .................................... 374/132; 128/664; 128/736; 374/129; 374/170; 374/182; 374/2

[58] Field of Search ................... 374/2, 120, 121, 129, 374/130, 132, 170, 182; 250/352; 356/43; 340/584, 600; 128/664, 736

[56] References Cited

U.S. PATENT DOCUMENTS

| | | | |
|---|---|---|---|
| 2,562,538 | 7/1951 | Dyer | 374/132 |
| 2,804,069 | 8/1957 | Schwamm et al. | 128/2 |
| 3,091,693 | 5/1963 | Rudomanski et al. | 374/129 |
| 3,465,149 | 9/1969 | Flint | 250/83.3 |
| 4,005,605 | 2/1977 | Michael | 374/129 |
| 4,166,390 | 9/1979 | Benzinger | 250/352 |
| 4,191,197 | 3/1980 | Benzinger | 128/736 |
| 4,301,682 | 11/1981 | Everest | 374/112 |
| 4,433,924 | 2/1984 | Quinn, III | 374/2 |
| 4,527,896 | 7/1985 | Irani et al. | 356/43 |
| 4,634,294 | 1/1987 | Christol et al. | 374/130 |
| 4,639,883 | 1/1987 | Michaelis | 374/182 |
| 4,702,618 | 10/1987 | Maund | 374/126 |
| 4,784,149 | 11/1988 | Berman et al. | 374/129 |
| 4,790,324 | 12/1988 | O'Hara et al. | 374/129 |

OTHER PUBLICATIONS

Geist, Jon, and Blevin, W. R., "Chopper-Stabilized Null Radiometer Based Upon an Electrically Calibrated Pyroelectric Detector", Applied Optics, vol. 12, No. 11, Nov. 1973, pp. 2532-2535.

Phelan, Jr., Robert J. and Cook, A. R., "Electrically Calibrated Pyroelectric Optical-Radiation Detector", Applied Optics, vol. 12, No. 10, Oct. 1973.

Primary Examiner—William A. Cuchlinski, Jr.
Assistant Examiner—Diego F. F. Gutierrez
Attorney, Agent, or Firm—Fulwider Patton Lee & Utecht

[57] ABSTRACT

A biomedical thermometer for taking the temperature of a person at various body sites, including the ear, includes a radiation detector, a temperature detector for measuring the temperature of the radiation detector, and a heating and cooling unit for changing the temperature of the radiation detector. The system also includes a temperature processor for generating an output proportional to the absolute temperature of the radiation detector, responsive to signals generated by the radiation detector and the temperature detector.

17 Claims, 5 Drawing Sheets

INFRARED THERMOMETRY SYSTEM AND METHOD

BACKGROUND OF THE INVENTION

1. Field of the Invention

This invention relates generally to thermometry, and more particularly to a temperature controlled null radiometer suitable for use as a biomedical thermometer.

2. Description of Related Art

Variations in the internal temperatures of temperature measuring instruments tend to affect the calibration of such instruments. Temperature measuring devices therefore may include a mechanism for maintaining a relatively constant internal temperature. Frequently this takes the form of a heat sink which will stabilize the internal temperature of the device, but will also permit the internal temperature of the device to slowly adjust to ambient temperature. More active systems for controlling internal temperature of a temperature measuring device have also been used. For example, it has been suggested to provide an infrared transducer-transmitter for noncontact temperature measurement with a liquid cooling jacket for maintaining the internal temperature of the device at a relatively constant temperature. A thermistor would be used in a feedback loop with an amplifier altering the gain of amplification of the temperature detector, to compensate for internal temperature fluctuation. A system for heating or cooling a thermal reference source of an infrared thermometer, based upon a measured temperature of target is also known. The temperature of the reference source is maintained at a constant temperature near the target temperature, to provide for more accurate readings.

A unique tympanic thermometer utilizing a system for heating and cooling of air blown into the ear canal is also known. The temperature of the air is measured, and controlled until a temperature equilibrium is reached between the ingoing air and the outgoing air. A null temperature difference between the ingoing and outgoing air serves as an indication of when a temperature reading of the air should be used to determine the temperature of the inner ear. Unfortunately, this system suffers from a disadvantage of introducing temperature changes into the target area. A procedure for providing an equilibrium temperature reading in a chopper stabilized null-type radiometer utilizing a pyroelectric receiver is also known. The null-type procedure is useful in overcoming an inaccuracy in the temperature coefficient of the pyroelectric receiver, which has an output current proportional to the time rate of change of a temperature difference. Another type of chopper stabilized infrared thermometer utilizes an associated calibration unit maintained at a reference temperature, which the thermometer probe compares with temperature readings of a target.

It would be useful to provide an infrared thermometer utilizing a null-type procedure in which the output of the radiation detector is proportional to the difference between the temperature of the target and the known temperature of the radiation detector, so that when a zero reading is measured, the temperature of the target can be determined, to provide a direct measurement of temperature. The present invention fulfills this need.

SUMMARY OF THE INVENTION

The present invention provides a null radiometer thermometry system utilizing a null radiometer signal, which is proportional to the difference between a radiation detector temperature and a target temperature, for determining when the temperature of the target is the same as that of the radiation detector.

Briefly and in general terms, an apparatus according to the invention for measuring the temperature of a target, comprises a radiation detector providing an output of a first signal proportional to the difference between the temperature of the target and the temperature of the infrared detector, a temperature detector for measuring the temperature of the infrared detector, a means for changing the temperature of the infrared detector, and a temperature processor for generating an output proportional to the absolute temperature of the infrared detector, responsive to the output from the infrared detector and the temperature detector.

The invention also briefly and generally provides a method for measuring the temperature of a target, by measuring output from an infrared radiation detector, changing the temperature of the infrared detector to cause the infrared detector to generate a substantially zero absolute value of electrical output, and measuring the temperature of the infrared detector, to determine the temperature of the target when the absolute value of the signal from the infrared detector is substantially zero.

In one preferred embodiment, a controller causes a heating and cooling means to force the temperature of the radiation detector to a value equal to the temperature of the target. The value output from the temperature detector is sampled, and converted to a value proportional to the temperature of the radiation detector, which can be displayed or can be made available for external uses. In another preferred embodiment, the controller causes the heating and cooling means to change the temperature of the infrared radiation detector to sweep through the temperature of the target. The output of the temperature detector is compared with output from the infrared detector to determine when the temperature of the radiation detector was equal to the temperature of the temperature detector, and a value proportional to the absolute temperature of the target is determined.

In a further alternative embodiment the controller drives the heating and cooling means to bring the detector to a predetermined or preset estimated target temperature, and an approximated target temperature value is determined. The approximated target temperature is then substituted for the previously estimated target temperature, to which the detector is equilibrated for a further approximated target temperature reading. The sequence of successive approximations is repeated until an adequately precise estimate of the target temperature can be made.

Other aspects and advantages of the invention will become apparent from the following detailed description, and the accompanying drawings, illustrating by way of example the features of the invention.

DETAILED DESCRIPTION OF THE INVENTION

Figure 1:
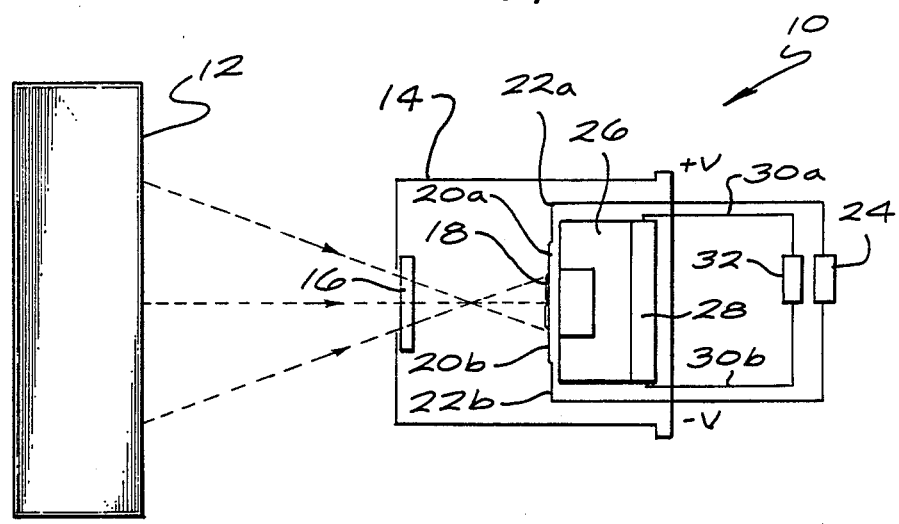
FIG. 1 is a block diagram illustrating the apparatus of the invention.
Figure 2:
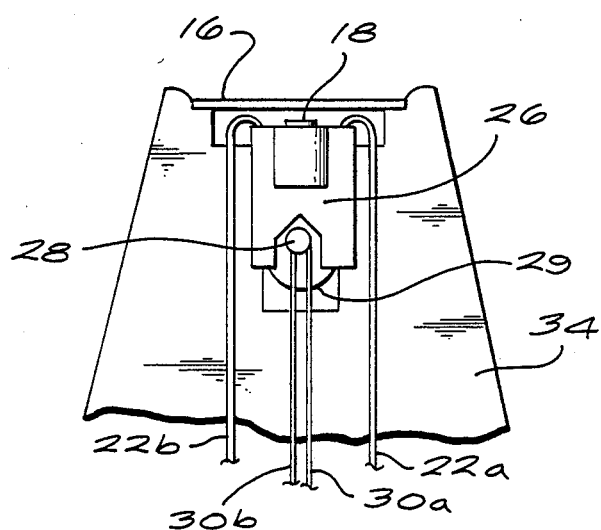
FIG. 2 is a partial cross section showing the radiation detector and temperature detector.

As is shown in the drawings for purposes of illustration, the invention is embodied in a null radiometer thermometer for taking the temperature of a person at various body sites, including the ear, and includes a radiation detector, a temperature detector for measuring the temperature of the infrared detector, and means for changing the temperature of the infrared detector. The system also includes a temperature processor for generating an output proportional to the absolute temperature of the infrared detector, responsive to signals generated by the infrared detector and the temperature detector.

In one preferred embodiment, the infrared thermometer includes a thermopile as the infrared detector, a heat sink, and a thermistor, used to measure the temperature of the reference junctions. The thermistor may also be used to heat the reference junctions. In an alternative embodiment, the invention also includes a heater/cooler for controlling the temperature of the infrared radiation detector. A controller may cause the heater/cooler to force the temperature of the radiation detector to a value equal to the temperature of the target, or in an alternative method may cause the heater/cooler to change the temperature of the radiation detector to sweep through a temperature range encompassing the temperature of the target. In the first case, the output from the temperature sensor is sampled and converted to a value proportional to the temperature of the radiation detector. In the second case the output from the temperature detector is compared with output from the controller to determine when the temperature of the infrared radiation detector, focused on the target, was equal to the temperature of the target. The output of the temperature detector where the radiation detector produces a null signal is proportional to the absolute temperature of the target. In each case, the output value can also be displayed and made available for external uses.

A second alternative embodiment consists of driving the radiation detector to a temperature that is based on a best estimate of the target temperature. When the temperature of the radiation detector is adequately stable, a measurement is made of the output voltage of the infrared detector. The sequence is then repeated using the measured output voltage to make the next estimate of the target temperature. The sequence is repeated until an adequately accurate estimate of the target temperature can be made.

In accordance with the invention, there is provided an apparatus for measuring infrared radiation emitted from a target, comprising radiation detector means for receiving radiation from the target, adapted to generate a first electrical signal proportional to the difference between the temperature of the target and the temperature of the radiation detector means; a temperature detector for measuring the temperature of the radiation detector means, and adapted to generate a second electrical signal indicative of the temperature of the radiation detector means; means for changing the temperature of the radiation detector means; and temperature processor means responsive to the first signal and the second signal, and adapted to generate a third signal proportional to the absolute temperature of the radiation detector and the target.

The invention further provides for a method for measuring infrared radiation emitted from a target, utilizing an apparatus including a radiation detector, a temperature detector, and a means for changing the temperature of the radiation detector, comprising the steps of measuring the output from the radiation detector; changing the temperature of the radiation detector to cause said radiation detector to generate a signal having a subtantially zero absolute value; and measuring the temperature of the radiation detector to determine the temperature of the target when the absolute value of the signal generated by the radiation detector is substantially zero.

As is shown in the drawings, in a preferred embodiment, the infrared thermometer apparatus comprises a radiometer 10, adapted to measure electromagnetic radiation from, and determine the temperature of a target 12, emitting such radiation. In the preferred embodiment, the radiation detector is adapted to be sensitive to electromagnetic energy in the infrared range of the spectrum. Thus, the radiometer includes a housing 14, having an infrared radiation transmitting window 16 at one end of the housing, adapted to transmit infrared radiation from the target to an infrared radiation detector 18. The window is preferably relatively thin, and composed of a material sufficient to admit a wide band of infrared radiation onto the infrared detector, which is preferably a thin film thermopile. Other infrared detectors, such as a bolometer, or a pyroelectric detector may be utilized in the invention, with minor modifications. Other radiometers sensitive to other ranges of electromagnetic radiation, such as ultraviolet, or visible light, may also be used.

Electrical contacts 20a and 20b are connected to the thermopile radiation detector, and are in turn connected by electrical conductors 22a and 22b to a controller. The infrared radiation detector is mounted in close proximity to a heat sink 26 preferably composed of aluminum, to provide for a means of stabilizing the temperature of the thermopile. A thermistor 28 is also mounted near the thermopile on the heat sink, by thermally conductive epoxy 29. Electrical conductors 30a and 30b connect the thermistor to a temperature processor 32. In the most preferred embodiment, the thermistor 28 is utilized for both heating the heat sink and thermopile, and for sensing the temperature of the heat sink and thermopile. In this embodiment the temperature processor has the functions of not only determining a temperature value from the electrical signals generated by the thermistor, but also generating current to the thermistor to regulate the temperature of the thermistor. The heat sink, thermistor, and electrical connections to the thermistor and the radiation detector are all preferably embedded in a protective material, such as ABS plastic 34. Information from the temperature processor can be shown on the display 36 or output to an external device 37.

Figure 3:
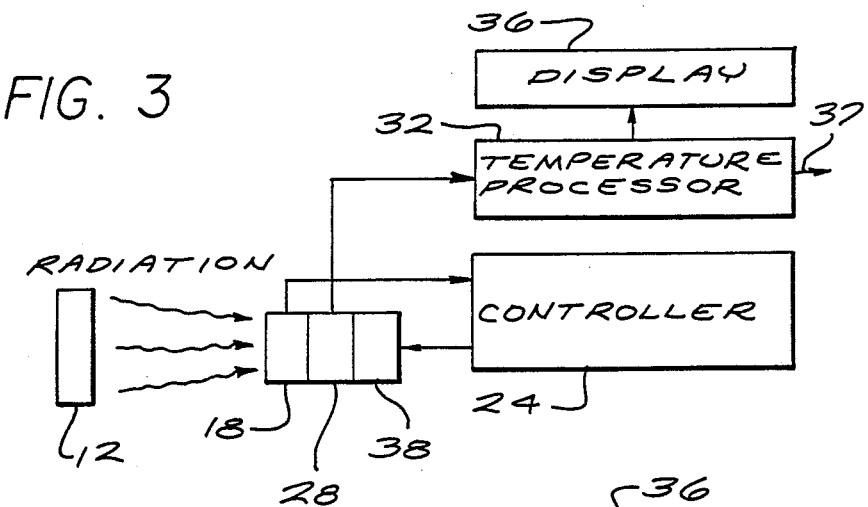
FIG. 3 is a block diagram of a second embodiment of the invention.
Figure 4:
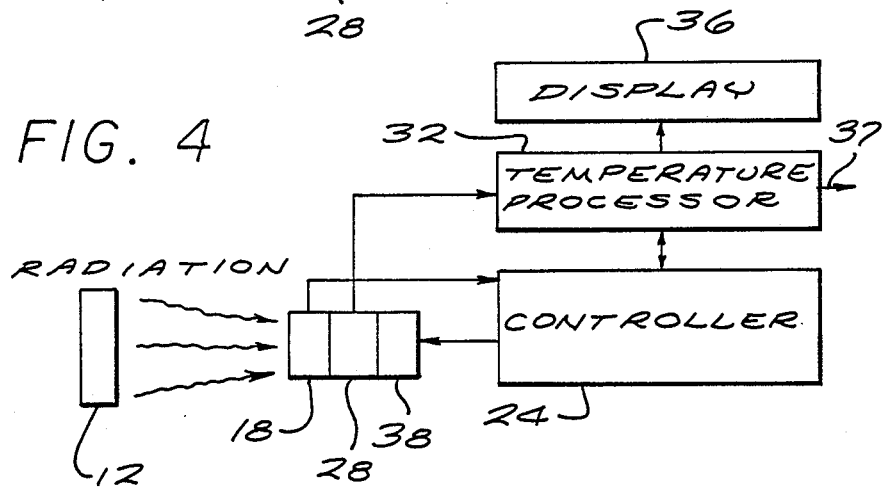
FIG. 4 is a block diagram of a third embodiment of the invention.

With reference to FIGS. 3 and 4, in an alternative embodiment, a heater/cooler 38 is provided in addition to the temperature sensor 28. The heater/cooler may be a combination of a heating thermistor and electronically controlled miniature cooling device or may be merely a combination of a heating thermistor in combination with a large heat sink adapted to bring the internal temperature of the radiometer approximately to ambient temperature when current to the heating thermistor is switched off by the controller 24.

The system shown in FIG. 3 operates as a tracking null radiometer, providing a continuous display of the temperature of the target. The infrared radiation detector's output is proportional to the difference between the temperature of the target and the temperature of the infrared radiation detector, and is directed to the controller. Output from the controller governs the internal temperature control of the heater/cooler, which can change the temperature of the infrared radiation detector. The controller generates an output which causes the heater/cooler to force the temperature of the infrared radiation detector to a value that is equal to the temperature of the target. The controller determines that this condition is being maintained by evaluating the absolute value of the output the radiation detector, which approaches zero as the temperature difference between the infrared radiation detector and the target approaches zero. Output from the temperature detector is sampled by the temperature processor, which converts the output from the temperature detector to an output that is proportional to the absolute temperature of the radiation detector, which is in turn equivalent to the temperature of the target. The temperature display converts the output from the temperature processor to a display viewable by a user, and output from the temperature processor is also available for external devices.

The system shown in FIG. 4 is a sampling null radiometer. The system of FIG. 1 also may be utilized as a sampling null radiometer. In these embodiments, a sampled display of the temperature of the target is provided. An initial approximate temperature of the target is determined by the temperature processor and the controller, based upon signals from the radiation detector and the temperature detector. Upon receiving an input such as a trigger signal to initiate a measurement sample, the controller generates an output that causes the heater/cooler to ramp the temperature of the radiation detector to sweep from a temperature lower than that of the initial approximate measurement to a value that is greater than the maximum possible temperature of the target. Typically, the temperature sweep of the radiometer would be from ambient temperature, such as 25° C., up to a maximum fever temperature of approximately 40° C. Alternatively, the temperature of the radiation detector could of course be made to sweep from a maximum temperature above the initial approximate temperature to a predetermined minimum temperature. The output from the temperature detector and the output from the controller are compared by the temperature processor to determine when the temperature of the radiation detector was equal to the temperature sensor. The temperature processor utilizes this temperature information to determine a value that is proportional to the absolute temperature of the target.

Figure 5:
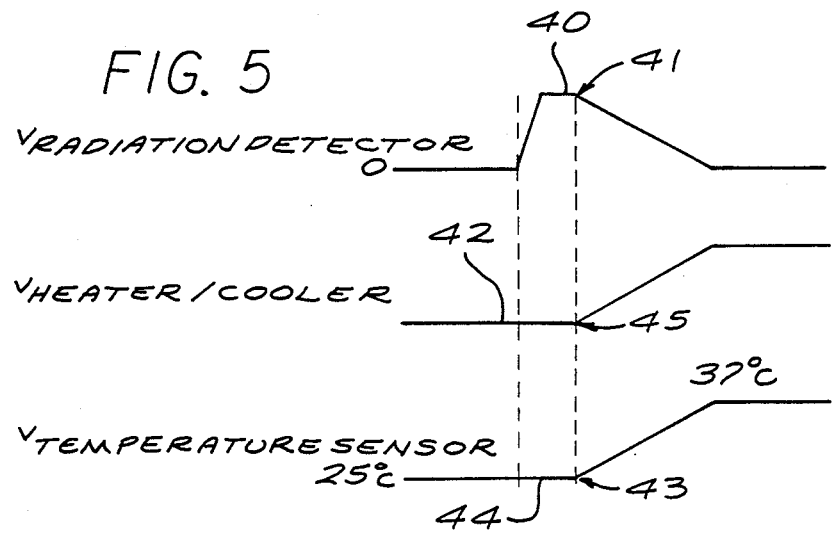
FIG. 5 illustrates an approximate waveform of a signal from a radiation detector of the invention and the waveforms and timing of the temperature control of the system in a temperature tracking mode.

FIG. 5 illustrates the signal generated by the radiation detector in the case where the temperature of the target is tracked, so that the temperature of the radiation detector is caused to approach as nearly as possible the temperature of the target in order to reduce the signal from the radiation detector to an absolute minimum or null signal. The voltage level 40 of the signal from the radiation detector begins to decrease at 41 as soon as the temperature of the radiation detector begins to equilibrate with the temperature of the target, until a null signal from the radiation detector is achieved. The amount of current 42 provided to the heater/cooler begins to increase at 45, and the temperature level 44 indicated by the temperature detector begins to change at 43. As is illustrated in FIG. 5, heating of the radiometer by increasing the amount of current 42 to the heater/cooler increases the amount of current signal 44 from the thermistor.

Figure 6:
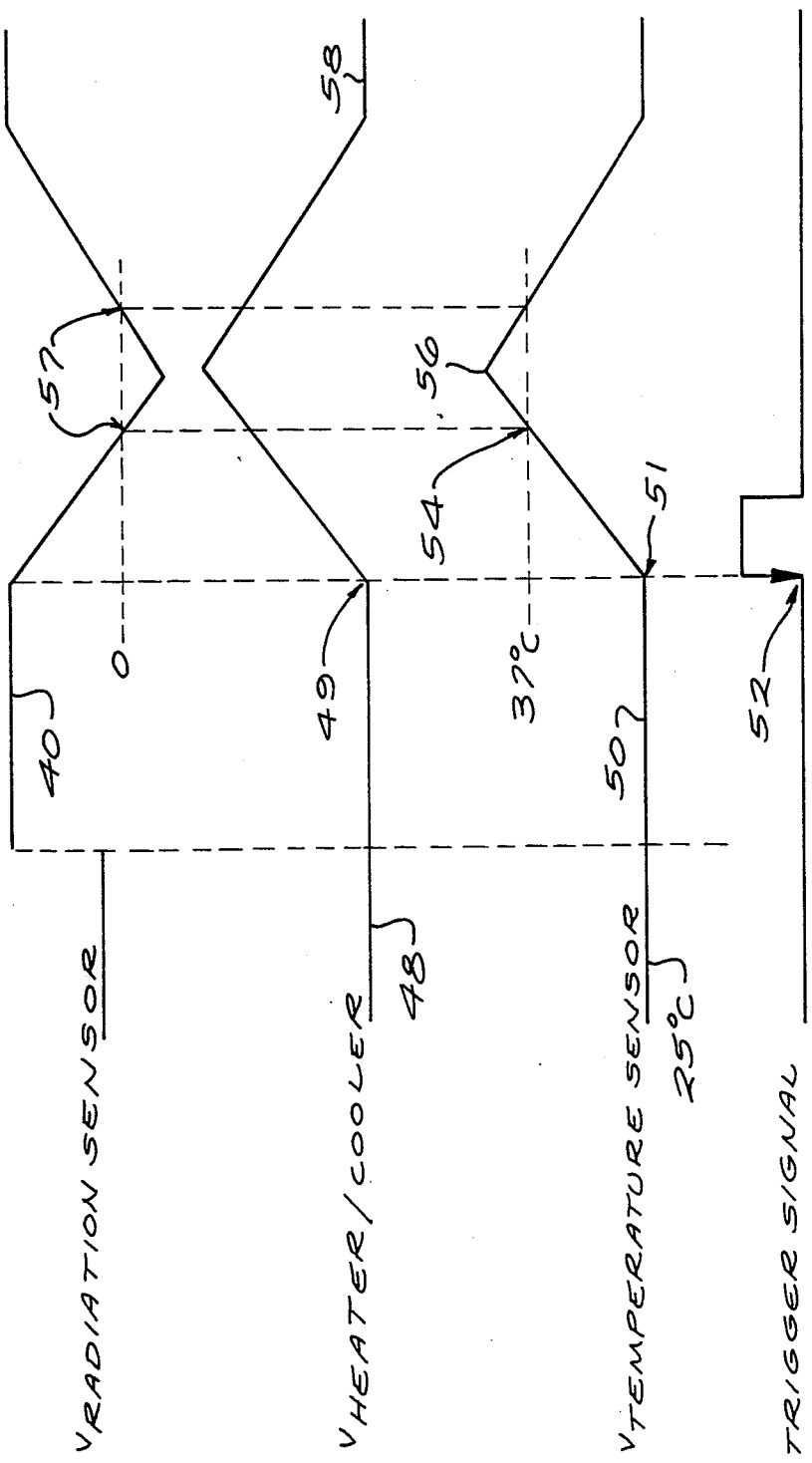
FIG. 6 shows approximate waveform timing sequences of the temperature control of the system in a sampling temperature control mode.

As is shown by way of example in FIG. 6, the operation of the radiometer as a sampling null radiometer involves the ramping of the current level 48 to the heat/cooler from an initial level at 49, by the controller. The temperature level 50 begins to increase shortly thereafter at 51, in response to the trigger signal 52 reaching the null point at 54, typically the normal temperature of a patient at approximately 37° C., and continuing until the temperature reaches a maximum of 40° C. at 56. The null point of the temperature reading is indicated by an approximately zero reading of the radiation detector at 57. The current level to the heater/cooler drops back to a baseline level 58, and the temperature of the radiation detector gradually drops back to the ambient baseline level 60.

The temperature measuring device's ability to measure the target's temperature may be affected by any factor that causes electromagnetic radiation from sources other than the desired target to enter and leave the system. If this occurs the displayed temperature will shift away from the correct temperature; this shift may not be proportional to the temperature of the target. The factors that can cause a shift may include but may not be limited to radiation received by the radiation detector from objects in the field of view, either in front of or behind the target, or even from objects outside the field of view.

The transmission can be through a transparent target, of electromagnetic radiation in the pass band of the radiation detector, between the radiation detector and an object or objects in the field of view of the system and behind the target. The object or objects must be at a temperature that differs from that of the target to have an effect on the system. The transmission of electromagnetic radiation, in the pass band of the radiation detector may occur between the radiation detector and an object or objects outside the field of view of the system by reflection off an object or objects, including the target, in the field of view of the system. The transmission of electromagnetic radiation, in the pass band of the radiation detector, may also occur between the radiation detector and an object or objects, other than the target, in the field of view of the system. These objects may include but are not limited to air, lenses, windows, filters and reflective surfaces that are part of the optical system.

Figure 7:
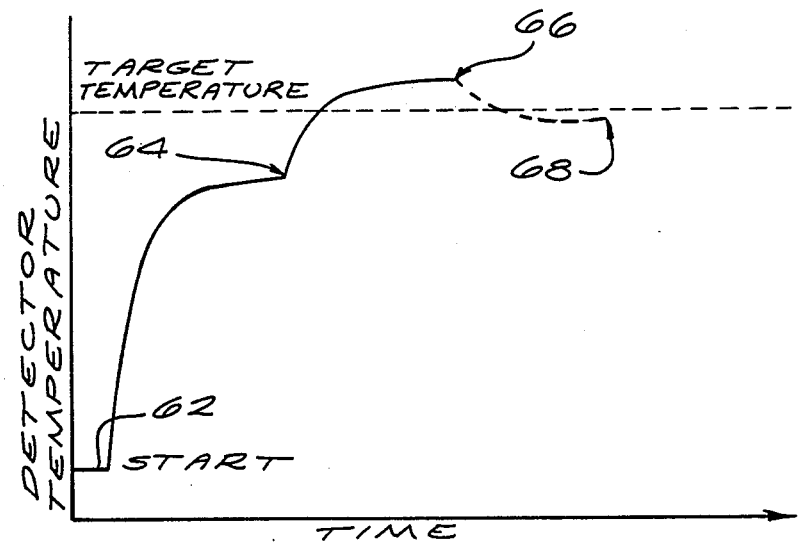
FIG. 7 is a graph of temperature detection using the successive approximation method.
Figure 8:
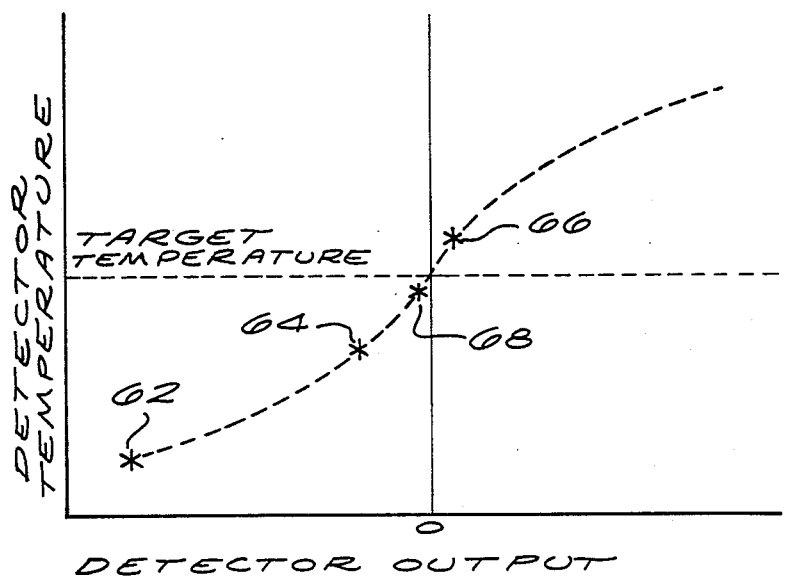
FIG. 8 is a graph of detector temperature against detector output in the successive approximation method.

Referring to FIGS. 7 and 8, a method of successive approximations may also be used with the infrared thermometer of the invention. In this second alternative method, the controller drives the radiation detector temperature from starting value at room temperature 62 to a first estimated temperature 64, which may be predetermined, for example at 37° C., or preset by an operator. When the temperature of the infrared detector has sufficiently equilibrated, a reading of temperature based upon the present temperature of the detector and the signal from the radiation detector is substituted for the first estimated temperature. The radiation detector temperature is then driven to this second estimated temperature 66, and a further temperature reading is determined as before. This second temperature may similarly be used as a third estimated temperature 68, and so on, until a desired degree of precision is reached, by determining the amount of variation of the temperature readings from one reading to the next, as is commonly known in the art. In most cases only two cycles will be required. To monitor a temperature continuously, the cycle would be continuously repeated, with new estimates of the monitored temperature becoming available at the completion of each cycle.

Figure 9:
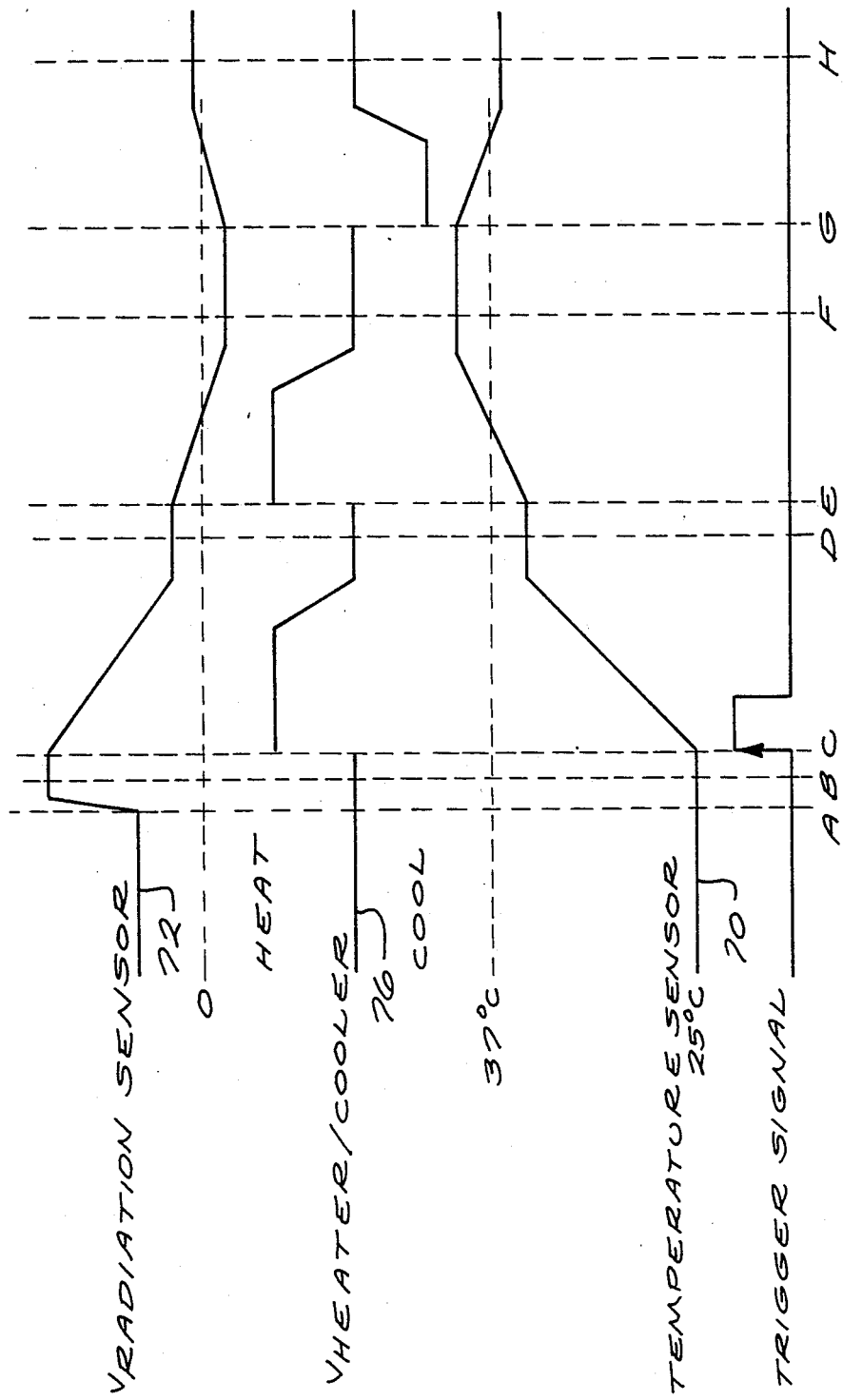
FIG. 9 is a chart of temperature control in the invention in a successive approximation mode.

FIG. 9 illustrates an alternative sequence of events tht may occur when a three sequence measurement is executed after the target temperature has changed from 25° C. to 37° C. At A the target temperature changes; the radiation detector's temperature 70, as indicated by the temperature detector, is less than 37° C. The voltage 72 from the radiation detector changes in response to the target temperature change and reaches a steady state value at B. The trigger signal 74 starts the measurement process at C. The processor evaluates the voltage from the radiation detector based upon previously determined characteristics of the target, and makes an estimate of the target temperature. The processor then applies the necessary voltage 76 to the heater/cooler to cause the radiation detector to be heated to the estimated target temperature. The processor uses the measurements made by the temperature detector as the feedback required to control the temperature of the radiation detector.

When the radiation detector temperature is stable and the radiation detector output is stable (at D), the processor makes a second estimate of the target temperature. In this example the radiation detector temperature is still lower than the target temperature. The processor then applies the necessary voltage to the heater/cooler at E to cause the radiation detector to be heated to the second estimated target temperature.

When the radiation detector has stabilized at the second estimated temperature and the radiation detectors output is stable (at F), the processor makes a third estimate of the temperature of the target. In this example the radiation detector temperature is now higher than the target temperature. The processor then applies the necessary voltage to the heater/cooler (at G) to cause the radiation detector to be cooled to the third estimated target temperature.

When the radiation detector has stabilized at the third estimated temperature and the radiation detector output is stable (H), the processor makes a fourth estimate of the temperature of the target. This temperature is then displayed as the measured target temperature. If this estimate does not have a high enough confidence level then the cycle above can be repeated until an adequate confidence level is reached.

If it is desired to track the target temperature then the cycle can be continually repeated and the display continually updated.

In the foregoing description, it has been demonstrated that the infrared thermometry system of the present utilizes a null temperature processing technique, allowing for determination of the temperature of a target, without the necessity for temperature measurement at multiple body sites, including sites such as the ear, which do not contain mucous membranes, in a relative short period of time.

Although specific preferred embodiments of the invention have been described and illustrated, it is clear that the invention is susceptible to numerous modifications and embodiments within the the ability of those skilled in the art, and without the exercise of the inventive faculty. Thus, it should be understood that various changes in form, detail and application of the present invention may be made without departing from the spirit and scope of the invention.

I claim:

1. An apparatus for measuring electromagnetic radiation emitted from a target, comprising:
    (a) radiation detector means for receiving radiation from said target, adapted to generate a first electrical signal proportional to the difference between the temperature of said target and the temperature of said radiation detector means;
    (b) a temperature detector for measuring the temperature of said radiation detector means, and adapted to generate a second electrical signal indicative of the temperature of said radiation detector means; and
    (c) means for changing the temperature of said radiation detector means, said means for changing the temperature of said radiation detector means being responsive to said first signal, and further including means for controlling said means for changing the temperature to reduce the absolute value of said first signal to substantially zero.

2. The apparatus of claim 1, wherein said temperature processor means further includes means for converting said third signal to a value representing the temperature of said target.

3. The apparatus of claim 1, wherein said temperature processor means further includes means for displaying a value proportional to the absolute temperature of said radiation detector means.

4. The apparatus of claim 1, wherein said temperature processor further includes means for displaying the temperature of said target.

5. An apparatus for measuring electromagnetic radiation emitted from a target, comprising:
    (a) radiation detector means for receiving radiation from said target, adapted to generate a first electrical signal proportional to the difference between the temperature of said target and the temperature of said radiation detector means;
    (b) a temperature detector for measuring the temperature of said radiation detector means, and adapted to generate a second electrical signal indicative of the temperature of said radiation detector means;
    (c) means for changing the temperature of said radiation detector means;
    said means for changing the temperature of said radiation detector means including means for causing the temperature of said radiation detector means to sweep through a temperature range encompassing an initially determined approximate temperature of said target; and temperature processor means responsive to said first signal and said second signal, and adapted to generate a third signal proportional to the absolute temperature of said radiation detector means.

6. The apparatus of claim 5, further including means for determining the temperature of said target when said first signal output of said radiation detector means is substantially zero.

7. A method for measuring radiation emitted from a target, utilizing an apparatus including a radiation detector having an output proportional to the difference in temperature of said radiation detector and said target, a temperature detector, and means for changing the temperature of said radiation detector, comprising the steps of:

(a) measuring the output from said radiation detector;

(b) changing the temperature of said radiation detector to cause said radiation detector to generate a signal having a substantially zero absolute value; and (c) measuring the temperature of said radiation detector to determine the temperature of said target when absolute value of said signal generated by said radiation detector is substantially zero.

8. The method of claim 7, further including the step of initially determining an approximate temperature of said target, and wherein said step of changing the temperature of said radiation detector comprises causing the temperature of said radiation detector to sweep through a temperature range including said initial approximate temperature of said target.

9. The method of claim 8, wherein said initial approximate temperature of said target above the temperature of said radiation detector, and the temperature of said radiation detector is increased to a temperature above said initial approximate temperature of said target.

10. The method of claim 8, wherein said initial approximate temperature of said target is lower than the temperature of said radiation detector, and the temperature of said radiation detector is decreased to a temperature below said initial approximate temperature of said target.

11. The method of claim 7, further including the step of determining an absolute temperature of said target when said measured output from said radiation detector is a substantially null signal, indicating the temperature of said radiation detector is substantially equal to the temperature of said target.

12. The method of claim 11, further including the step of displaying said absolute temperature of said target.

13. The method of claim 7, wherein said step of changing the temperature of the radiation detector comprises controlling the temperature of said radiation detector to cause said radiation detector sensor to generate a substantially null signal, so as to substantially track changes in temperature of said target.

14. The method of claim 7, further including the step of determining the temperature of said radiation target based upon the temperature of said radiation detector when the output from said radiation detector is a substantially null signal, indicating the temperature of said radiation detector and said target are equal, and displaying said temperature measurement.

15. A method for measuring electromagnetic radiation emitted from a target, utilizing an apparatus including a radiation detector having an output proportional to the difference in temperature between said radiation detector and said target, a temperature detector, and a means for changing the temperature of said radiation detector, comprising the steps of:

(a) controlling the temperature of said radiation detector to approximate an initial estimated target temperature;

(b) measuring the output of said radiation detector;

(c) determining a subsequent estimated target temperature based upon said initial estimated target temperature and said radiation detector output; and (d) repeating steps (a), (b), and (c) to determine successive approximations of estimated target temperature.

16. The method of claim 15, further including the step of determining an estimated absolute temperature of said infrared target after a predetermined number of said successive approximations.

17. The method of claim 16, further including the step of displaying said absolute temperature of said target.

* * * * *